United States Patent
Mingot

(10) Patent No.: US 12,023,771 B2
(45) Date of Patent: Jul. 2, 2024

(54) DEVICE FOR HOLDING IN POSITION A PRODUCT TO BE PROCESSED AND A METHOD

(71) Applicant: Roberto Mingot, Conegliano (IT)

(72) Inventor: Roberto Mingot, Conegliano (IT)

(73) Assignee: Roberto Mingot, Conegliano (IT)

( * ) Notice: Subject to any disclaimer, the term of this patent is extended or adjusted under 35 U.S.C. 154(b) by 223 days.

(21) Appl. No.: 17/778,610

(22) PCT Filed: Dec. 11, 2020

(86) PCT No.: PCT/IB2020/061804
§ 371 (c)(1),
(2) Date: May 20, 2022

(87) PCT Pub. No.: WO2021/116991
PCT Pub. Date: Jun. 17, 2021

(65) Prior Publication Data
US 2022/0410327 A1    Dec. 29, 2022

(30) Foreign Application Priority Data
Dec. 12, 2019  (IT) .......................... 102019000023859

(51) Int. Cl.
*B23Q 3/154*   (2006.01)
*B24B 31/00*   (2006.01)
(Continued)

(52) U.S. Cl.
CPC .......... *B23Q 3/1543* (2013.01); *B25B 11/002* (2013.01); *B24B 31/003* (2013.01); *B24B 41/06* (2013.01)

(58) Field of Classification Search
CPC ..... B25B 11/002; B24B 41/06; B24B 41/066; B24B 31/003; B24B 31/064; B24B 31/00; B24B 31/06; B23Q 3/15–1546
See application file for complete search history.

(56) References Cited

U.S. PATENT DOCUMENTS 2,517,770 A    8/1950  Demark
2,612,082 A *  9/1952  Angell .................. B23Q 3/086
                                                  29/418
(Continued)

FOREIGN PATENT DOCUMENTS

FR    1259856 A      4/1961
KR   101925835 B1   12/2018

OTHER PUBLICATIONS

International Search Report for PCT Application Serial No. PCT/IB2020/061804, dated Apr. 7, 2021, 3 pages.

*Primary Examiner* — Tyrone V Hall, Jr.
(74) *Attorney, Agent, or Firm* — Ference & Associates LLC

(57) ABSTRACT

A device for holding in position a product to be processed includes a base connectable by magnetic interaction to a work surface of an apparatus for tumbling or polishing and comprising a first portion and a second portion movable along an operating direction mutually towards or away from a first and a second operating position. The device also includes a retaining support connected to the base and configured to hold in a stable position a product to be processed between a first and a second retaining element. Between the first and the second portion of the base an actuation member is interposed, configured to move the same portions between the first operating position and the second operating position. A method for holding in position a product to be processed is also disclosed.

16 Claims, 10 Drawing Sheets

(51) Int. Cl.
*B24B 41/06* (2012.01)
*B25B 11/00* (2006.01)

(56) References Cited

U.S. PATENT DOCUMENTS

| | | | | |
|---|---|---|---|---|
| 3,519,262 A | * | 7/1970 | Dedek | B41J 1/00 269/287 |
| 4,829,720 A | * | 5/1989 | Cavalieri | B24B 19/14 451/365 |
| 6,571,841 B1 | | 6/2003 | Patton | |
| 8,061,699 B2 | * | 11/2011 | Wang | F01D 25/285 269/9 |
| 2011/0117820 A1 | * | 5/2011 | Sroka | B24B 41/06 451/36 |

* cited by examiner

DEVICE FOR HOLDING IN POSITION A PRODUCT TO BE PROCESSED AND A METHOD

The present application is a National Phase Entry of PCT International Application No. PCT/IB2020/061804, which was filed on Dec. 11, 2020, and claims priority to Italian Patent Application Serial No. 102019000023859, which was filed on Dec. 12, 2019, the contents of which are hereby incorporated by reference.

TECHNICAL FIELD

The present invention relates to a device for holding in position a product to be processed.

In particular, the present invention falls within the field of general mechanics and, more precisely, the field of mechanical processing, preferably surface processing.

In addition, the invention relates to a method for holding in position a product to be processed.

PRIOR ART

Generally, the creation of components by sintering, moulding, casting, milling, additive manufacturing, three-dimensional printing or similar techniques results in items which may have surface defects, so-called "burrs", and/or items with a surface roughness value such as to not allow the immediate use thereof for the purpose for which they were developed.

In fact, mainly in the automotive and aerospace sector, the surface roughness values of a component, for example of impellers or turbines, must be precise and equal to a predetermined limit for reasons strictly related to the fluid dynamics of the same component and, therefore, depending on the final efficiency that the motor in which they must be installed must achieve.

Therefore, to date, it is known to use polishing or tumbling techniques on the specific component produced so as to provide a surface finishing process capable of abrading a surface in the most homogeneous way possible and up to a precise predetermined value.

In particular, the tumbling involves inserting one or more components inside a barrel (also called a tumbler) in which an abrasive material is also present. The direct application of a vibration or a sussultatory movement to the barrel generates, within the latter, a plurality of impacts of the abrasive material against the components being processed in order to finely smooth the surface of the latter.

In order to obtain a homogeneous surface processing of certain types of components, it is necessary that the same components are constrained to the barrel to be integral with the latter during the sussultatory vibration thereof, while the abrasive material is free to move therein so as to impact the surfaces of interest, smoothing them.

However, the technique known to date provides that the components are fixed to the bottom of the barrel through the interposition of a plurality of screws. This procedure is very time-consuming, partly because in order to maximize the productivity of the polishing step, the quantity of components inside the barrel is maximized. In other words, the close arrangement of the components reduces the useful space for applying and removing the screws.

In addition, the vibration applied to the barrel is such as to loosen the constraint which the screws are capable of applying between the components and the bottom of the barrel. Therefore, it is possible that during the polishing processing the components separate from the barrel, are no longer solidly constrained thereto and, therefore, the quality of the processing is reduced.

An alternative example of a fixing apparatus for processing a component is illustrated in document KR101925835.

SUMMARY

In this context, the technical task of the present invention is to propose a device, and a related method, for holding in position a product to be processed which obviates the drawbacks of the known art as mentioned above.

In particular, an object of the present invention is to provide a device capable of being solidly constrained to the tumbling or polishing apparatus throughout the processing and, at the same time, capable of holding the component firmly in position with respect to the same apparatus and the same device.

A further object of the present invention is to provide a device which is readily applicable to the tumbling or polishing apparatus so as to reduce the installation operations for performing the polishing and removal operations once the polishing has been performed.

A further object of the present invention is to provide a device configured to expose only the surfaces of interest of the component to the polishing processing.

Finally, an object of the present invention is to provide a versatile device, i.e. capable of holding in a stable position different types of components separately.

The stated technical task and specified objects are substantially achieved by a device and a related method for holding in position a product to be processed, which comprise the technical features disclosed in the independent claims. The dependent claims correspond to further advantageous aspects of the invention.

It should be highlighted that this summary introduces, in simplified form, a selection of concepts which will be further elaborated in the detailed description given below.

The invention relates to a device for holding in position a product to be processed in an apparatus for tumbling or polishing.

In particular, the device comprises:
  a base having a magnetic or ferromagnetic or electromagnetic element which can be connected to a work surface of the apparatus by means of magnetic interaction. The base comprises a first portion and a second portion movable along an operating direction mutually towards or away from a first and a second operating position;
  a retaining support connected to the base and configured to hold in a stable position a product to be processed. The retaining support has a first retaining element connected to the first portion and a second retaining element connected to the second portion;
  an actuation member configured to move the first and the second portion of the base, with the related retaining elements, between the first operating position and the second operating position. In particular, in the first operating position the retaining support is configured to hold in position the product to be processed, while in the second operating position the retaining support is configured to allow the removal from or installation in the device of a processed product or a product to be processed.

When the first and the second portion mutually approach each other in order to be configured in the first operating position to hold in position the product to be processed, the latter is advantageously held in position by the compression generated by the retaining elements between which it is interposed.

When the first and the second portion mutually move away from each other in order to be configured in the first operating position to hold in position the product to be processed, the latter is advantageously held in position by the pressure which the retaining elements generate on the portions of the same product to be processed which surround the device.

Even more advantageously, the magnetic coupling between the device and the work surface, in addition to ensuring a solid connection between the processing apparatus and the device (a necessary condition to ensure excellent quality), also increases the retaining of the product to be processed within the same device. In fact, the latter ensures that the product to be processed is held in position both as a function of the conformation thereof, and for the function of the actuation member which is configured to apply a sufficient force to hold the product to be processed solidly constrained to the device itself, and for the action of the magnetic attraction with the work surface.

Since the device is substantially divided into two distinct parts (each comprising a base portion and a retaining element) between which an actuation member is interposed, the magnetic attraction adds an additional safety element against the movement of the parts between the first and the second operating position, thus preventing the product to be processed from separating from the holding arrangement. Finally, the magnetic attraction is sometimes also capable of acting directly on the product to be processed (directly or indirectly) by applying thereon a pressing force towards the work surface.

If the device has a substantially rectangular base, the two distinct parts of the device can be divided by a vertical plane extending parallel to the short side of the base. Alternatively, the two distinct parts can be divided by a vertical plane extending parallel to the long side of the base. The choice of configuration depends on the shape of the product to be processed. Advantageously, in both configurations the actuation member is correctly dimensioned to allow the correct movement of the distinct parts mutually towards or away from one another.

The invention also relates to a method for holding in position a product to be processed by means of tumbling or polishing.

In detail, the method comprises the steps of:
providing an apparatus for tumbling or polishing;
providing a device, as described above;
moving the first portion and the second portion of the base with the related retaining elements into the second operating position so as to insert a product to be processed between the first retaining element and the second retaining element;
moving the first portion and the second portion into the first operating position so that the retaining elements of the retaining support hold in position the product to be processed;
inserting the device into the box shaped body of the apparatus for tumbling or polishing;
generating a field of magnetic attraction for constraining the device to the work surface of the apparatus so that the device and the work surface are solidly constrained and relatively stationary with respect to one another during processing.

BRIEF DESCRIPTION OF THE DRAWINGS

Further characteristics and advantages of the present invention will become more apparent from the indicative, and thus non-limiting, description of a preferred, but not exclusive, embodiment of a device for holding in position a product to be processed, as illustrated in the accompanying drawings, in which.

With reference to the drawings, they serve solely to illustrate embodiments of the invention with the aim of better clarifying, in combination with the description, the inventive principles on which the invention is based.

DETAILED DESCRIPTION

The present invention relates to a device for holding in position a product to be processed.

With reference to the figures, the device for holding in position a product to be processed has been generically indicated by the number 1, while the product has been generically indicated by the number 1000.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

Figure 1:
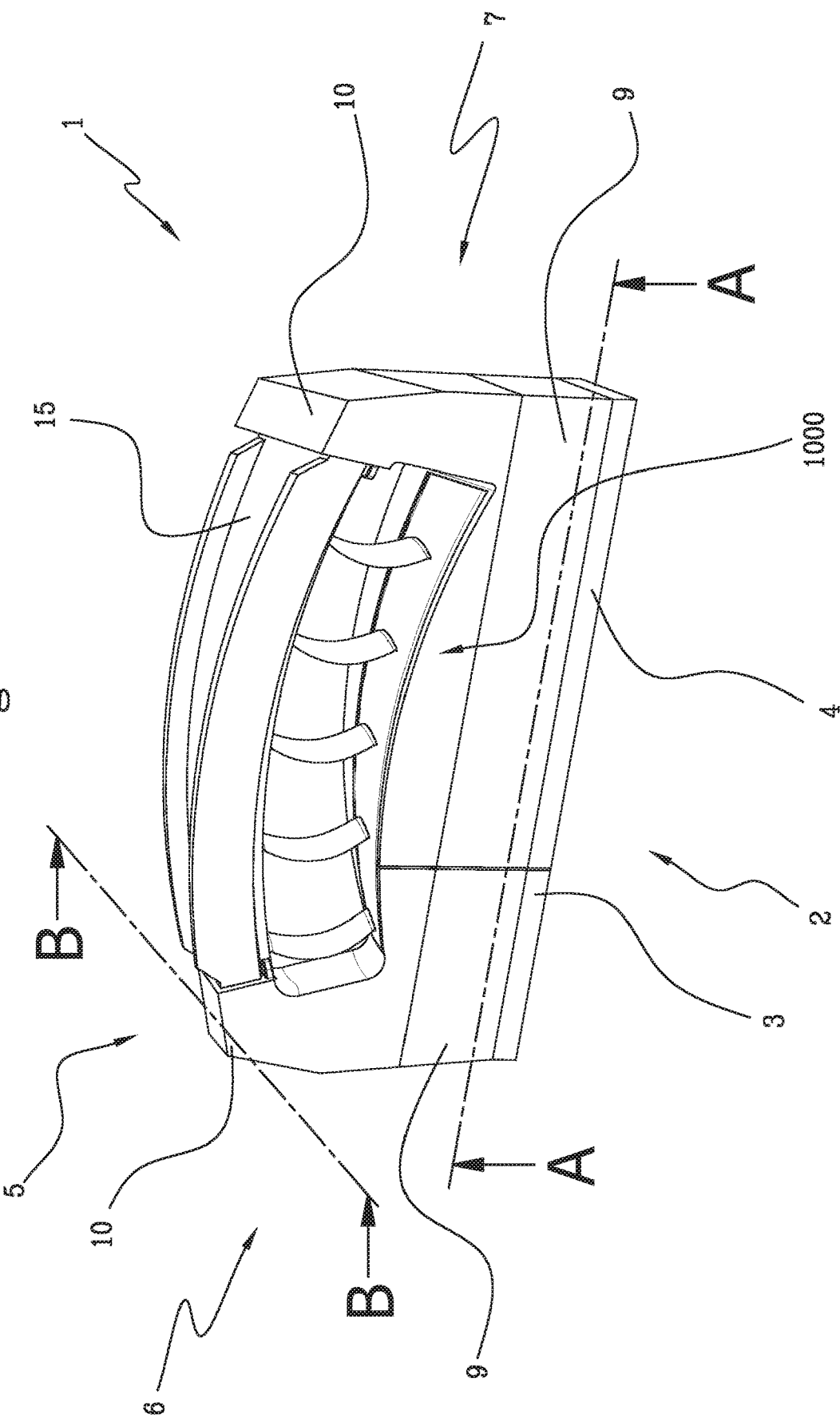
FIG. 1 illustrates, in a perspective view, a device for holding in position a product to be processed.

FIG. 1 illustrates a device 1 for holding in position a product 1000 to be processed in an apparatus 50 for tumbling or polishing.

In detail, the device 1 comprises a base 2 having a magnetic or ferromagnetic or electromagnetic element which can be connected to a work surface of the apparatus 50 by magnetic interaction and a retaining support 5 connected to the base 2 and configured to hold in a stable position a product 1000 to be processed.

Preferably, at least the base 2 of the device 1 comprises an element made of a metal material such that it is magnetic, ferromagnetic or electromagnetic (and, therefore, magnetizable).

Alternatively, the entire device 1 comprises an element made of a metal material which is magnetic, ferromagnetic or electromagnetic (and, therefore, magnetizable). For example, the device 1 can be made substantially as a single body (as also explained below) or it can have an inner core made of a magnetizable material.

The base 2, in turn, comprises a first portion 3 and a second portion 4 movable along an operating direction T mutually towards or away from a first and a second operating position.

The retaining support 5, in turn, comprises a first retaining element 6 connected to the first portion 3 and a second retaining element 7 connected to the second portion 4.

Figure 2:
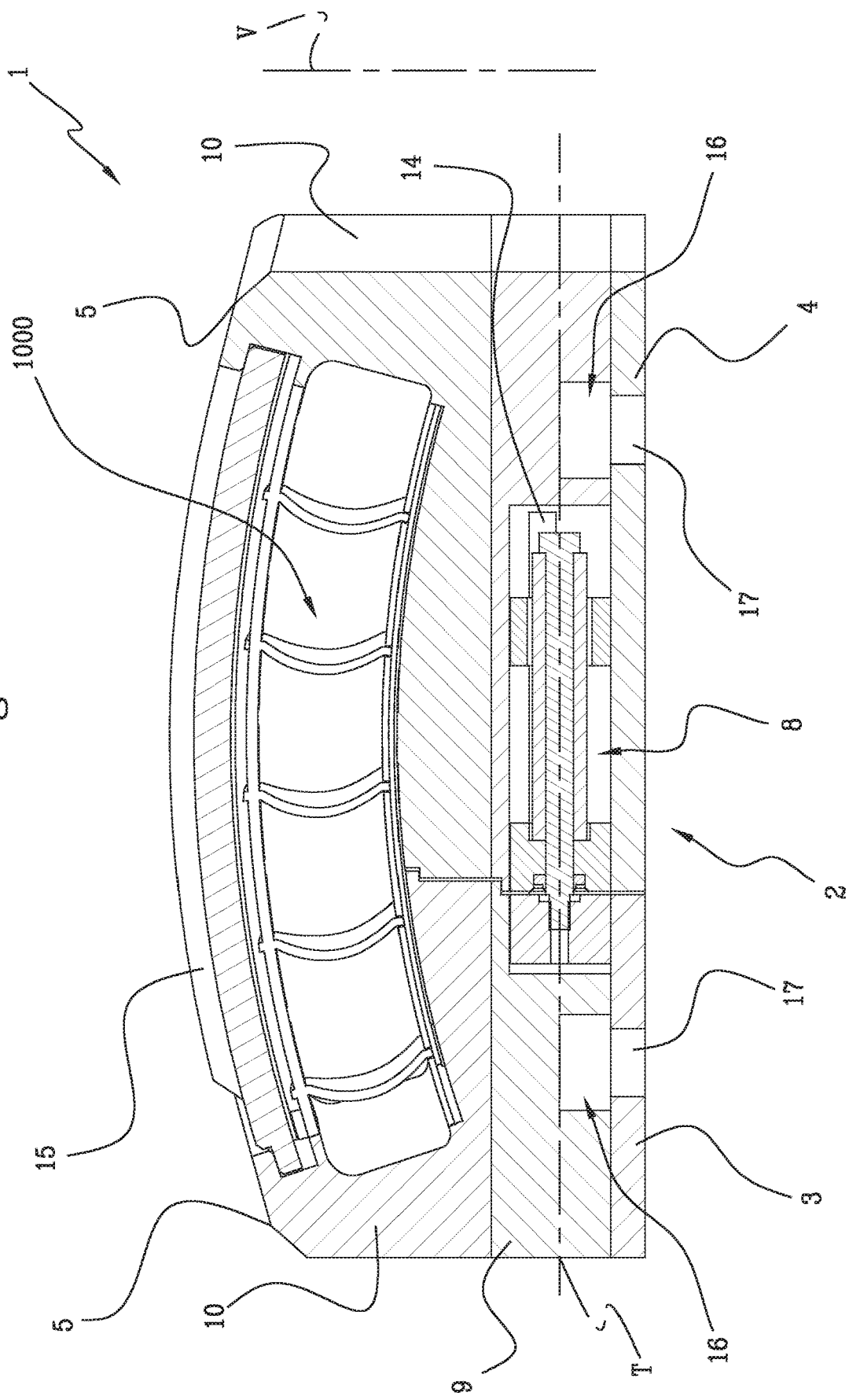
FIG. 2 illustrates, in a lateral view, a section along the plane A-A of the device shown in FIG. 1.
Figure 4:
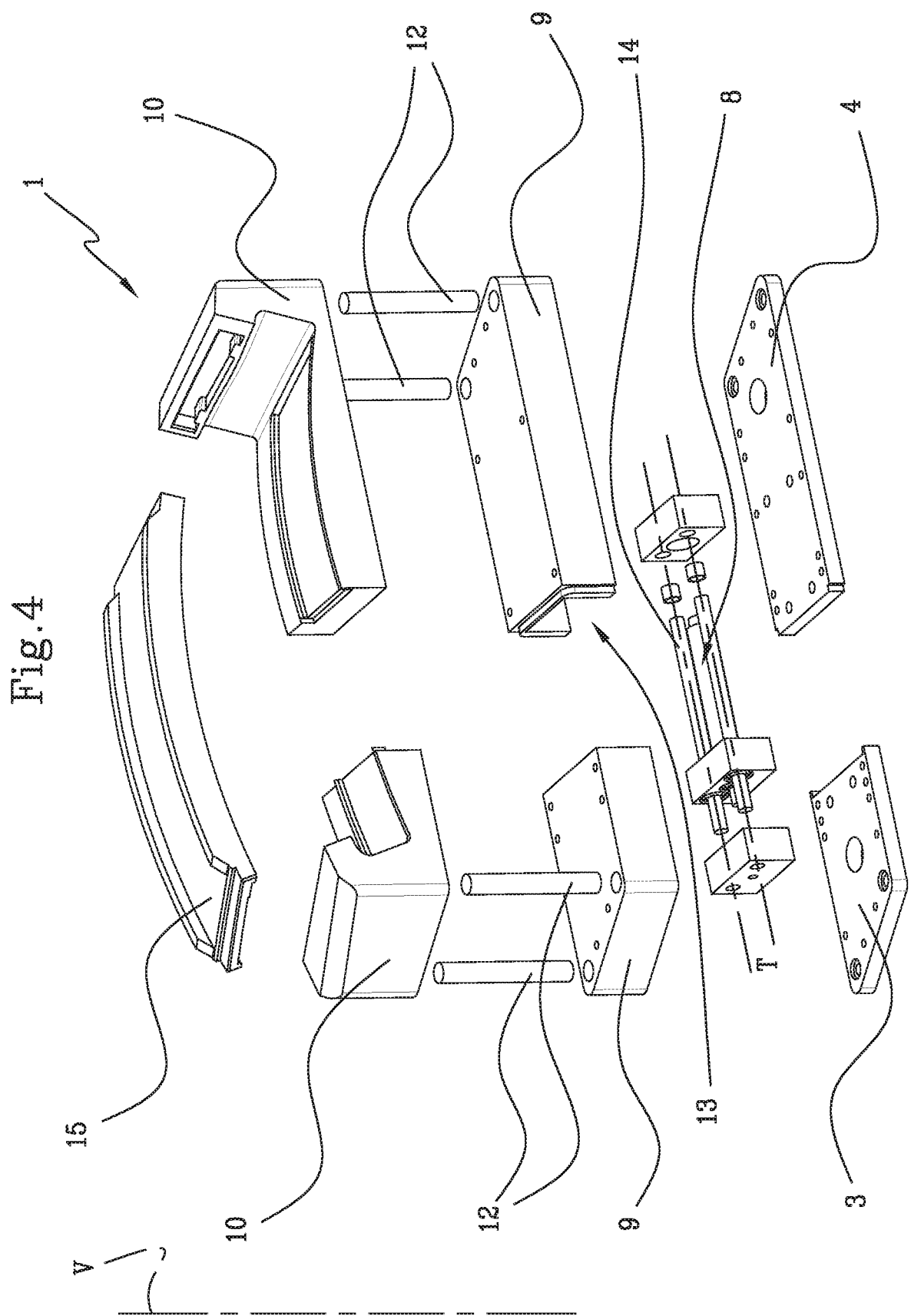
FIG. 4 illustrates, in a perspective view, an exploded view of the device illustrated in FIG. 1.

The device 1 further comprises an actuation member 8 (seen in FIGS. 2, 4).

The actuation member 8 is configured to move the first portion 3 and the second portion 4 of the base 2, together with the related retaining elements 6, 7, between the first operating position and the second operating position. In the first operating position, the retaining support 5 is configured to impart a force on the product 1000 to be processed so as to hold it in a stable and integral position with the same device 1.

Instead in the second operating position, the first and the second retaining element 6,7 are distanced from the product 1000 to be processed so as to allow the removal from or installation thereof in the device 1. In other words, in the second operating position, the retaining support 5 is configured not to interact directly with the processed product 1000 or product 1000 to be processed, which is therefore freely movable with respect to the device 1.

In other words, the actuation member 8 is configured to allow the first and the second portion 3, 4 of the base 2 (and therewith the related retaining elements 6, 7) to retain the product 1000 to be processed in a predetermined position. Thereby, the product 1000 to be processed is solidly constrained to the device 1 and, consequently, also to the work surface 51 of the apparatus for tumbling or polishing (and, therefore, with the entire apparatus itself).

According to one aspect of the invention, the actuation member 8 is interposed between the first portion 3 and the second portion 4 of the base 2 so as to define a connecting element capable of moving such portions at least into the first operating position so as to generate a thrust such as to hold in position a product 1000 to be processed in an apparatus 50 for tumbling or polishing.

According to a possible embodiment not illustrated, the actuation member 8 comprises a guide pinion-rack system, or a similar system, capable of allowing the mutual sliding of the first portion 3 and the second portion 4 along the operating direction T, together with the related retaining elements 6, 7. Thereby, the retaining element 8 allows the movement between the first and the second operating position and also the stable maintenance of at least one of such operating positions. In other words, if the first and the second portion 3, 4 were normally arranged in the first operating position, a guide pinion-rack system would allow them to be moved in the second operating position, keeping them in such a final position or in any intermediate position.

According to one aspect of the invention, each retaining element 6, 7 comprises a lower portion 9 and an upper portion 10. The lower portion 9 is interposed between the upper portion 10 and the base 2, while the upper portion 10 has an active surface 11 conformed to adapt to at least one portion of a product 1000 to be processed so as to retain it during processing, i.e., when the first portion 3 and the second portion 4 are arranged in the first operating position.

A first embodiment of the invention provides that the lower portion 9 and the upper portion 10 of each retaining element 8 define a single body.

In other words, a lower portion 9 and a respective upper portion 10 are indissolubly connected to one another. For example, if the retaining support 5 is made by moulding, the lower portion 9 and the respective upper portion 10 are made seamlessly during the same moulding step.

A second embodiment of the invention, as an alternative to the first embodiment, provides that each lower portion 9 and each upper portion 10 of the retaining elements 8 define entities which are physically separate and connectable to one another.

In other words, as seen in FIG. 4, each lower portion 9 and each upper portion 10 are made separately from each other and, therefore, define separate bodies which can be connected to one another so as to form the device 1.

Figure 3:
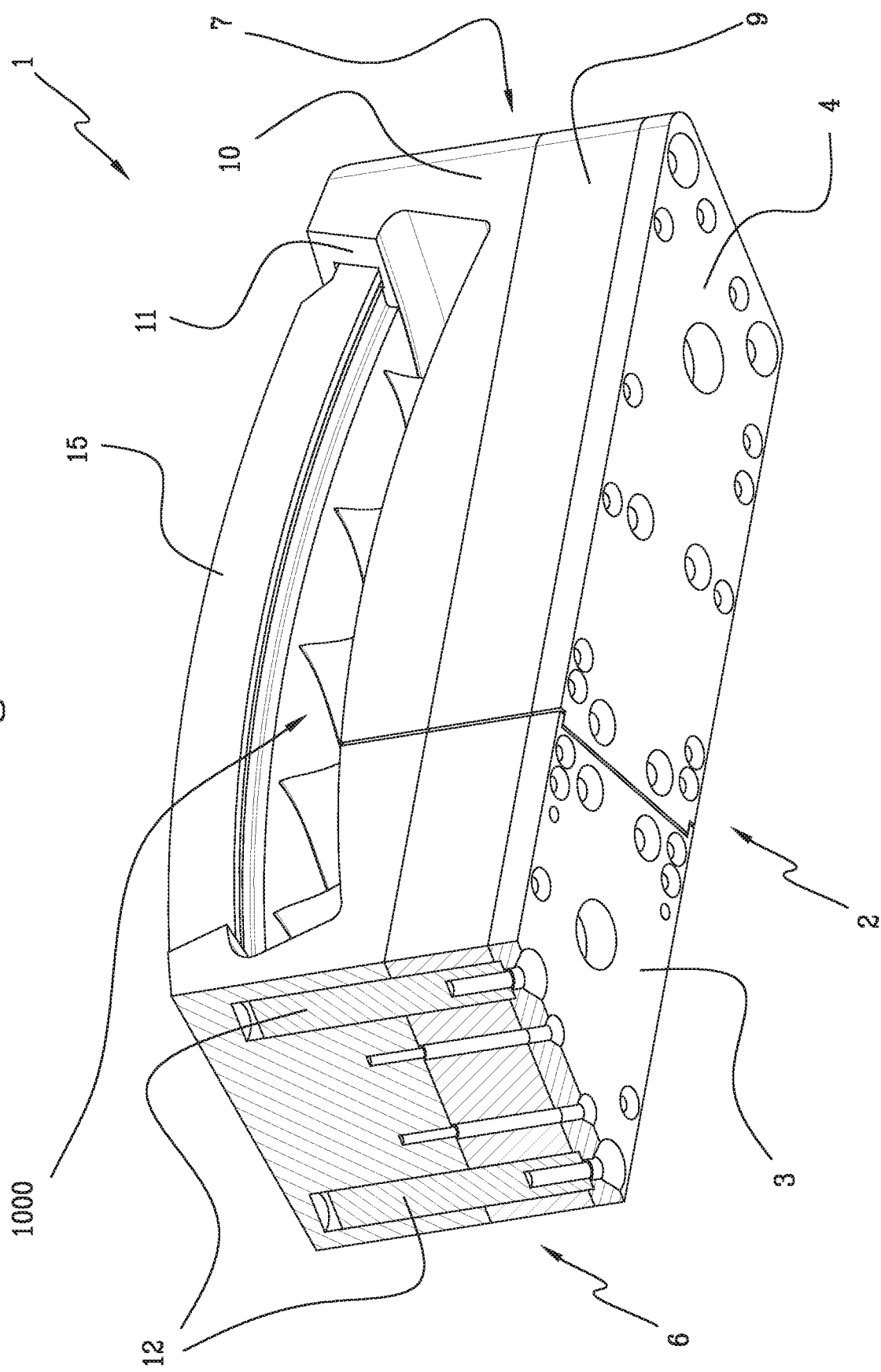
FIG. 3 illustrates, in a perspective view, a section along the plane B-B of the device shown in FIG. 1.

According to an aspect of the invention seen in FIGS. 3 and 4, the retaining support 5 comprises at least one junction element 12 interposed between a lower portion 9 and the respective upper portion 10 for constraining them to one another.

Preferably, the junction element 12 comprises a threaded screw and/or a pin capable of interposing between the lower portion 9 and the upper portion 10 to hold them together.

Even more preferably, the retaining support 5 comprises a plurality of junction elements 12 so that at least one pin and at least one threaded screw can be interposed between each lower portion 9 and the respective upper portion 10.

For example, the pin is preferably arranged on the lower portion 9 and extends towards the upper portion 10 to be able to fit into a housing which is counter-shaped and obtained on the latter. Therefore, the pin allows the two portions 9, 10 of the retaining support 5 to be held together and aligned. The latter also have cavities aligned with each other so as to allow the insertion of a screw. Preferably, a smooth or threaded through cavity is obtained on the lower portion 9, while a blind and threaded cavity is obtained on the upper portion 10 such as to allow the coupling with the thread of the threaded screw and, therefore, to guarantee the "package" seal of the retaining element 6, 7.

Even more preferably, the base 2 also has at least one through cavity, so that the screw interposes between the same base 2, the lower portion 9 and the upper portion 10, keeping everything together as the screw head abuts against the base 2, while the screw thread couples with the counter-thread present in the blind cavity of the upper portion 10.

According to an aspect of the invention partially seen in FIG. 3, a plurality of pins and/or threaded screws are arranged along an entire perimeter of the device 1.

According to one aspect of the invention seen in FIG. 4, the device 1 comprises a housing 13 defined between the base 2 and the retaining support 5. The housing 13 is configured to contain at least the actuation member 8.

According to another aspect of the invention, the actuation member 8 comprises an elastic element normally configured to move the first portion 3 and the second portion 4 of the base 2 into the first operating position. In other words, the elastic element is normally preloaded in compression or in extension so that the two portions 3, 4 of the base 2 are arranged in the first operating position to hold in position the product 1000 to be processed.

FIGS. 1, 2 illustrate the case where the elastic element is preloaded in compression. The first portion 3 and the second portion 4 in the first operating position are arranged adjacent to each other and the product 1000 is held in position as it is comprised between the first and the second retaining element 6, 7. For example, the product 1000 to be processed may be a small component or have a small portion capable of being housed in the space between the first and the second retaining element 6, 7.

Figure 5:
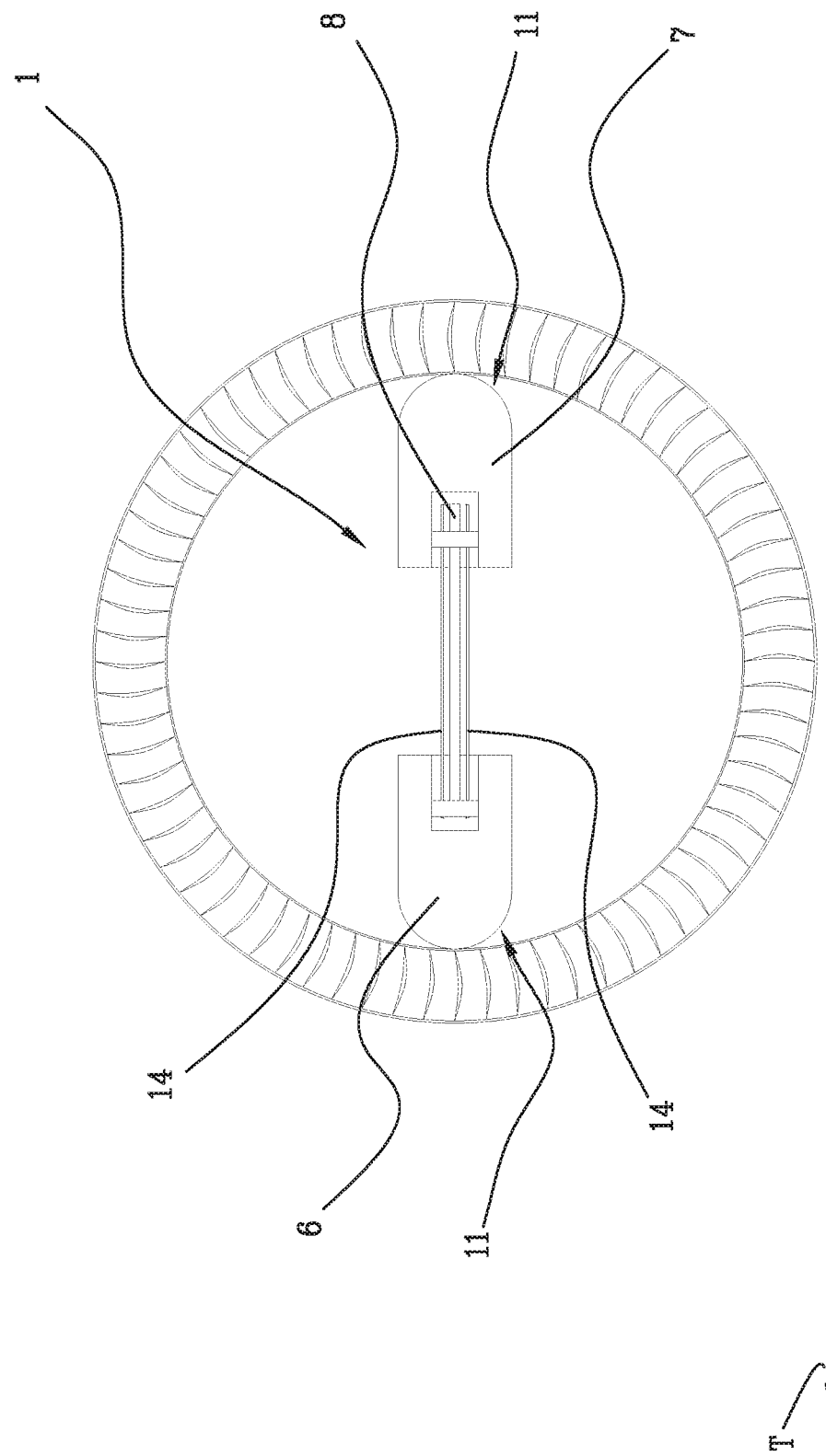
FIG. 5 illustrates, in a view from above, a possible embodiment of the device.

FIG. 5 illustrates the case where the elastic element is preloaded in extension. The first portion 3 and the second portion 4 in the first operating position are arranged distanced from each other along the operating direction T so that the first and the second retaining element 6, 7 are in contact with the product 1000 to be processed arranged outside the device 1. For example, the product 1000 to be processed may be an impeller with a circular extension. Thereby, the device 1 positioned inside the free circular area of the impeller is capable of holding it in position since the first and the second retaining element 6, 7 spaced along the operating direction T are each in contact with a respective portion of the impeller.

According to an aspect of the invention, the elastic element is a spring, preferably helical, or a gas spring.

In detail, as seen in FIGS. 2 and 4, the elastic element comprises a pair of supports also connected to the base. The elastic element applying a force on such supports is able to move the first portion 3 and the second portion 4 of the base 2 towards or away from each other.

According to another aspect of the invention illustrated in FIG. 4, the base 2 comprises at least one alignment element 14 interposed between the first portion 3 and the second portion 4. The alignment element 14 is configured to keep the first portion 3 and the second portion 4 of the base 2 aligned during the reciprocal movement thereof along the operating direction T between the first and the second operating position.

In detail, according to a possible embodiment, the alignment element 14 comprises a rod connected to a first support arranged on the base and capable of sliding through a hole made on a second support also arranged on the base. Preferably, the first and the second support are arranged on different portions of the base.

Preferably, the base 2 comprises a pair of alignment elements 14 arranged laterally to the actuation member 8.

In other words, the alignment element 14 is a guide configured to keep the components of the device 1 aligned with one another, during the movement between the first and the second operating position.

According to a further aspect of the invention, each alignment element 14 is arranged inside the housing 13.

According to an aspect of the invention, the base 2 comprises a plate made of a magnetic or ferromagnetic material adapted to interact with a magnetic field generated by a work surface of the apparatus.

Preferably, the plate has a thickness of about 1 centimetre and is made of stainless and magnetic or ferromagnetic materials.

According to another aspect of the invention, the plate is arranged below the base 2 with respect to the retaining support 5.

Preferably, as seen in the accompanying figures, the plate defines the base 2 on which the actuation member 8 is arranged and, if present, each alignment element 14. Therefore, according to this embodiment the retaining support 5 is connected directly to the magnetic or ferromagnetic plate. Consequently, the housing 13 is mainly moulded on the retaining support 5 and the plate defines a lower closing surface.

According to an aspect of the invention not illustrated in the accompanying figures, the retaining support 5 comprises a gasket element interposed between the retaining elements 6, 7.

Advantageously, the gasket is capable of compensating for any minimum misalignments and/or minimum constructional clearances (i.e., empty spaces caused by the fact that the first and the second portion 3, 4 of the base 2 do not abut against each other), for example caused by wear and intensive use of the device 1.

According to another aspect of the invention, the device 1 comprises a covering element 15 interposed between the first retaining element 6 and the second retaining element 7.

According to one aspect of the invention, the covering element 15 has two lateral ends such as to define a shape coupling with respective seats obtained on the first and the second retaining element 6, 7.

The covering element 15 is advantageously configured to impress on the product 1000 to be processed a pressing force towards the work surface of the apparatus along an orthogonal direction V to the operating direction T and to the same work surface.

More precisely, the covering element 15 has a contact surface facing, in use, towards the product 1000 to be processed. When the first and the second portion are normally arranged in the first operating position, the contact surface of the covering element 15 imparts a force along a direction substantially orthogonal to the product 1000 to be processed to hold the same in a stable position and, at the same time, to be able to prevent the processing from occurring on certain specific portions of the same product 1000, which portions are superimposed by the covering element 15.

In other words, when the actuation member 8 is normally preloaded in compression (and, therefore, the first and the second portion are normally arranged in the first operating position), the first and the second retaining element 6, 7 generate respective forces on the covering element 15 which hold it in a solidly constrained position with the entire device 1. At the same time, the curved conformation of the covering element 15 generates on the product 1000 to be processed a pressing force which keeps it firmly joined to the device 1 and, furthermore, solidly constrained to the latter.

More precisely, according to the embodiment illustrated in FIGS. 1 and 2, the covering element 15 has a partially conical shape to contain a portion of the turbine and adapt to the conformation of the latter.

Even more advantageously, the arrangement of a covering element 15 allows to prevent some surfaces of the product 1000 from being processed. Thereby, therefore, it is possible to obtain a selective processing of only the surfaces of interest.

Figure 6:
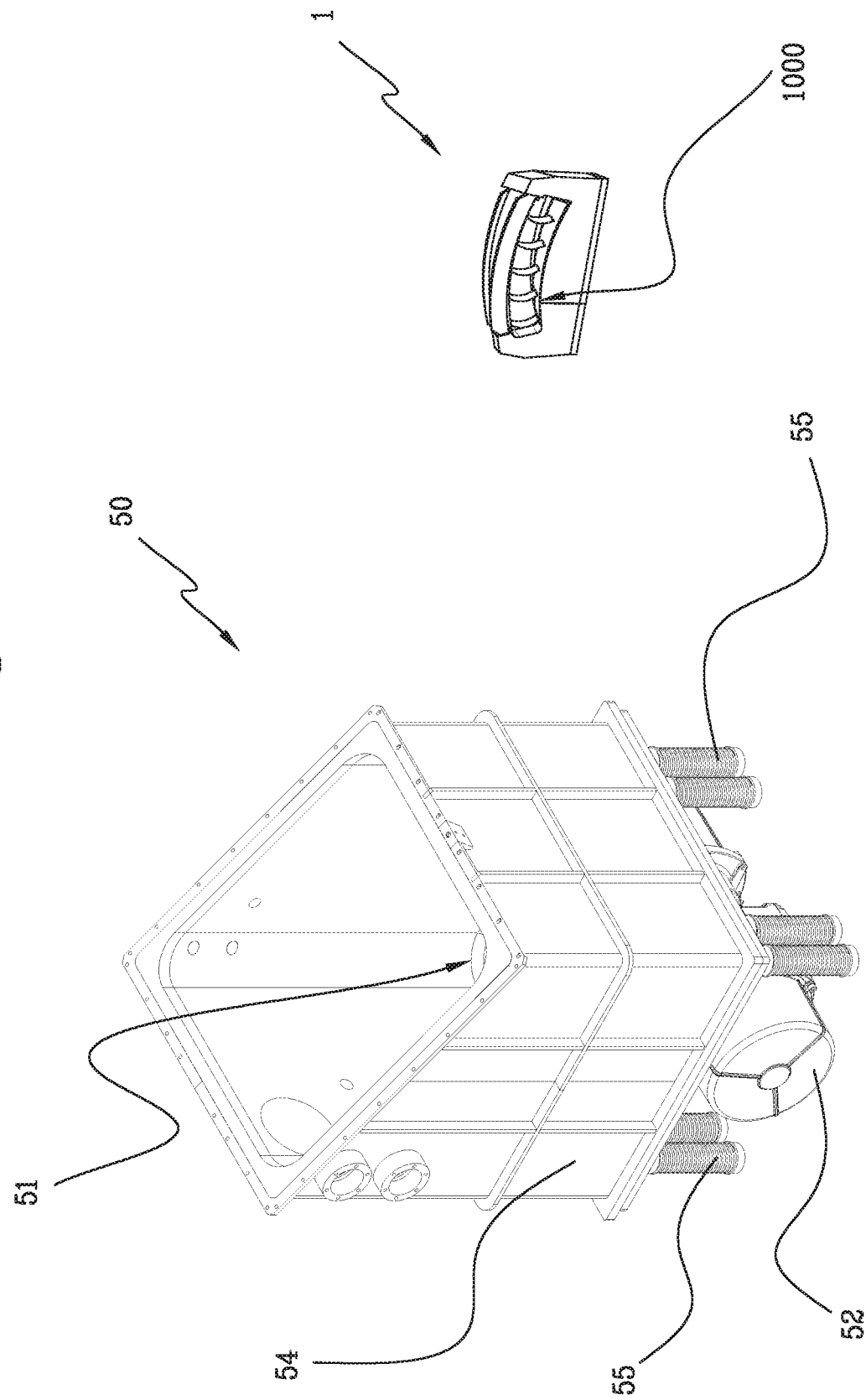
FIG. 6 illustrates, in a perspective view, an apparatus for tumbling or polishing and a device in a free condition.
Figure 7:
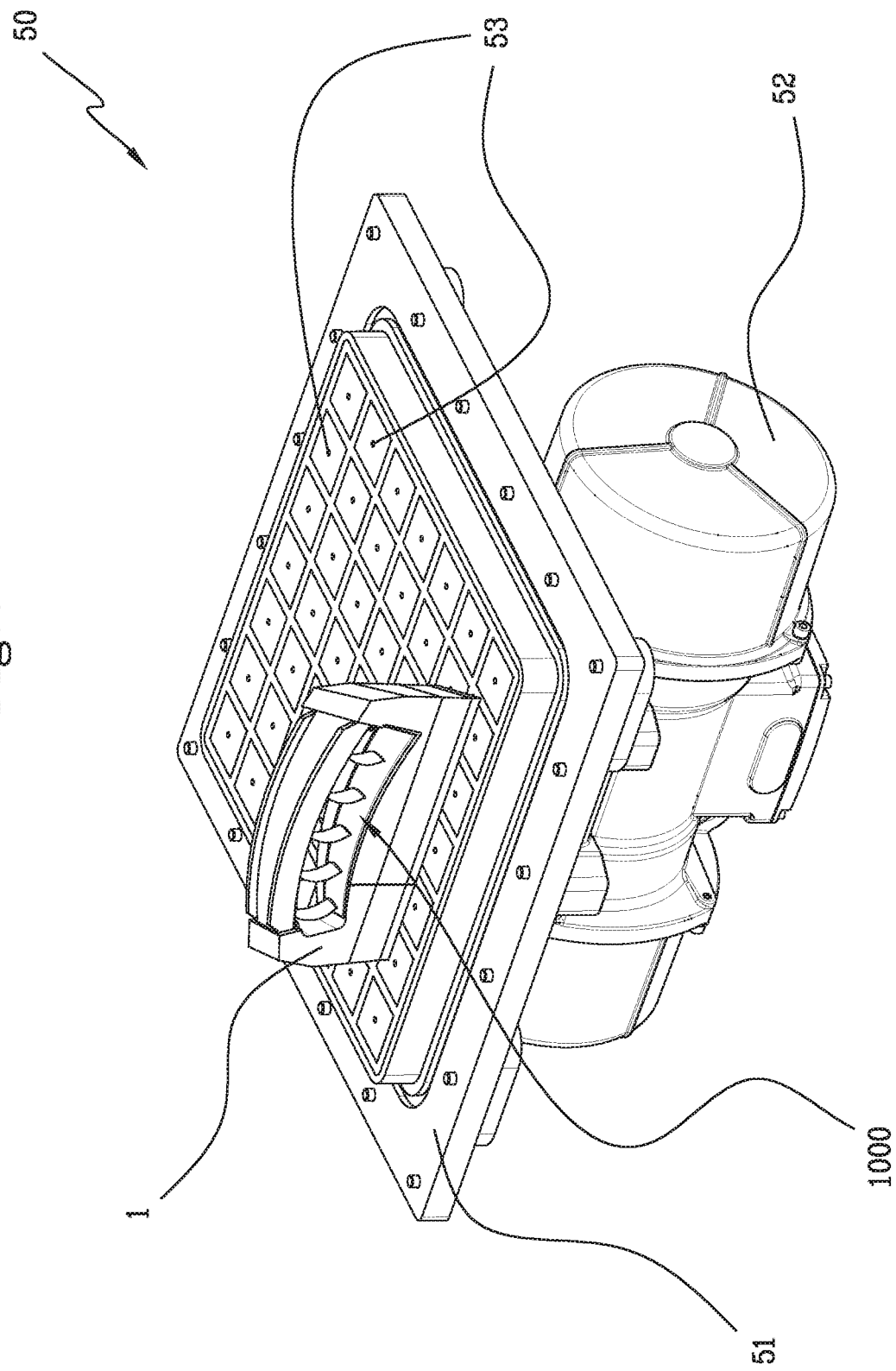
FIG. 7 illustrates, in a perspective view, an apparatus for tumbling or polishing to which some components have been removed and a device in a magnetic interaction condition.

FIG. 6 and FIG. 7 (the latter at least partially) illustrate an apparatus 50 for tumbling or polishing comprising a box shaped body 54 having a work plane 51 and configured to contain an abrasive material and at least one product 1000 to be processed, a motor 52 connected to the box shaped body and, more precisely, directly connected to the work surface 51. The motor 52 is configured to generate a sussultatory or vibrational movement on the box shaped body so as to activate the movement of the contained abrasive material and, therefore, start the polishing process. Advantageously, the motor 52 is solidly constrained to at least the work surface 51 so that the processing is as homogeneous as possible. A plurality of shock absorbers 55 is interposed between the box shaped body 55 (more precisely the work surface 51) and the ground.

The apparatus 50 also comprises a magnetic means 53 connected at least to the work surface 51 configured to generate a field of magnetic attraction or to interact with a field of magnetic attraction having field lines which intersect the same work surface 51.

Advantageously, a device 1 is insertable into the box shaped body on the work surface 51 to interact magnetically with the latter so as to be held in a solidly constrained position during a processing.

In other words, the device 1 is configurable between a free condition (FIG. 6), in which it is unconstrained and movable with respect to the same work surface 51, and a magnetic interaction condition (FIG. 7), in which it is held in a solidly constrained position with the work surface 51 during a tumbling or polishing process.

More precisely, according to one aspect of the invention, the activation of the magnetic means 53 allows the device 1 (in a condition of magnetic interaction) and the work surface 51 to join in a solidly constrained manner under the action of the magnetic attraction. Conversely, the deactivation of the magnetic means 53 brings the device 1 into a free condition in which it is freely moveable with respect to the work surface 51, from which it is then disconnected, in order to be handled by an operator so that the latter can remove the processed product 1000 and/or prepare a product 1000 to be processed.

According to one aspect of the invention, the work surface 51 is a magnetic surface connected to at least one electromagnet configured to magnetize the same work surface 51 during specific time intervals, for example during the processing period of the product 1000. Thereby, therefore, the step of removing (in addition to that of preparing) the device 1 from the work surface 51, at the end of the processing of the product 1000, is considerably simplified compared to the prior art.

A method for holding in position a product 1000 to be processed through tumbling or polishing, comprising the steps of:
  providing an apparatus 50 for tumbling or polishing;
  providing a device 1;
  moving the first portion 3 and the second portion 4 of the base 2 with the related retaining elements 6, 7 into the second operating position so as to be able to insert a product 1000 to be processed between the first retaining element 6 and the second retaining element 7;
  moving the first portion 3 and the second portion 4 of the base 2 into the first operating position so that the retaining elements 6, 7 of the retaining support 5 hold in position the product 1000 to be processed;
  inserting the device 1 into the box shaped body of the apparatus 50 for tumbling or polishing, positioning it on the work surface 51;
  generating a field of magnetic attraction for constraining the device 1 to the work surface 51 of the apparatus 50 so that the device 1 and the same work surface 51 are solidly constrained and relatively stationary with respect to one another during a processing step.

To simplify for an operator the step of moving the first portion 3 and the second portion 4 of the base 2 into the second operating position so as to be able to position the product 1000 to be processed, the device 1 can be installed on a movement system 100 (illustrated in FIGS. 8, 9 and 10) comprising hydraulic or pneumatic pistons, which movement system 100 is configured to apply a force such as to overcome the opposite force generated by the actuation member 8 and, therefore, move the first and the second portion 3, 4 of the base 2 along the operating direction T between the first and the second operating position.

To this end, according to a possible aspect of the invention seen in FIG. 2, the device 1 comprises at least one pair of seats 16*a*, 16*b* obtained at the base 2 along the operating direction T. More precisely, the seats 16*a*, 16*b* are obtained below each retaining element 6, 7, while the base 2 has through openings 17 arranged at a respective seat 16*a*, 16*b*.

Advantageously, the section of a seat 16*a*, 16*b* is larger than the section of a through opening 17. Thereby, a plunger of the movement system 100 (and, therefore, connected to the piston(s) of the same movement system 100) is insertable into a respective seat 16*a*, 16*b* of the device 1.

Preferably, the plunger has a bulb-shaped end portion, which is capable of being inserted into the seat 16*a*, 16*b* through the through opening 17 and, later during the movement between the first and the second operating position, to form a shape coupling with the step generated by the difference in sections between the seat 16*a*, 16*b* and the through opening 17.

Figure 8:
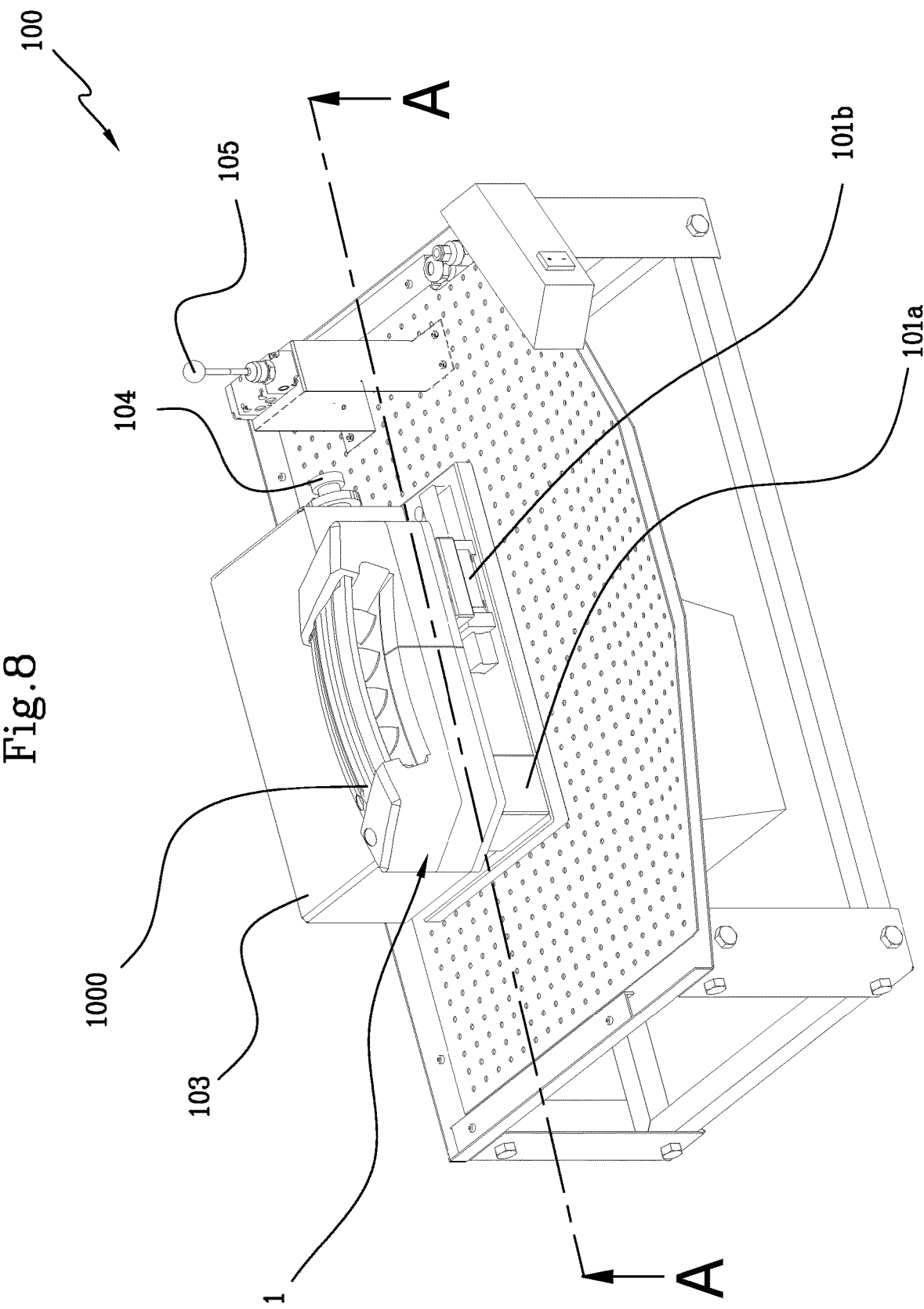
FIG. 8 illustrates, in a perspective view, a movement system for configuring the device illustrated in FIG. 1 at least in a closing position.
Figure 9:
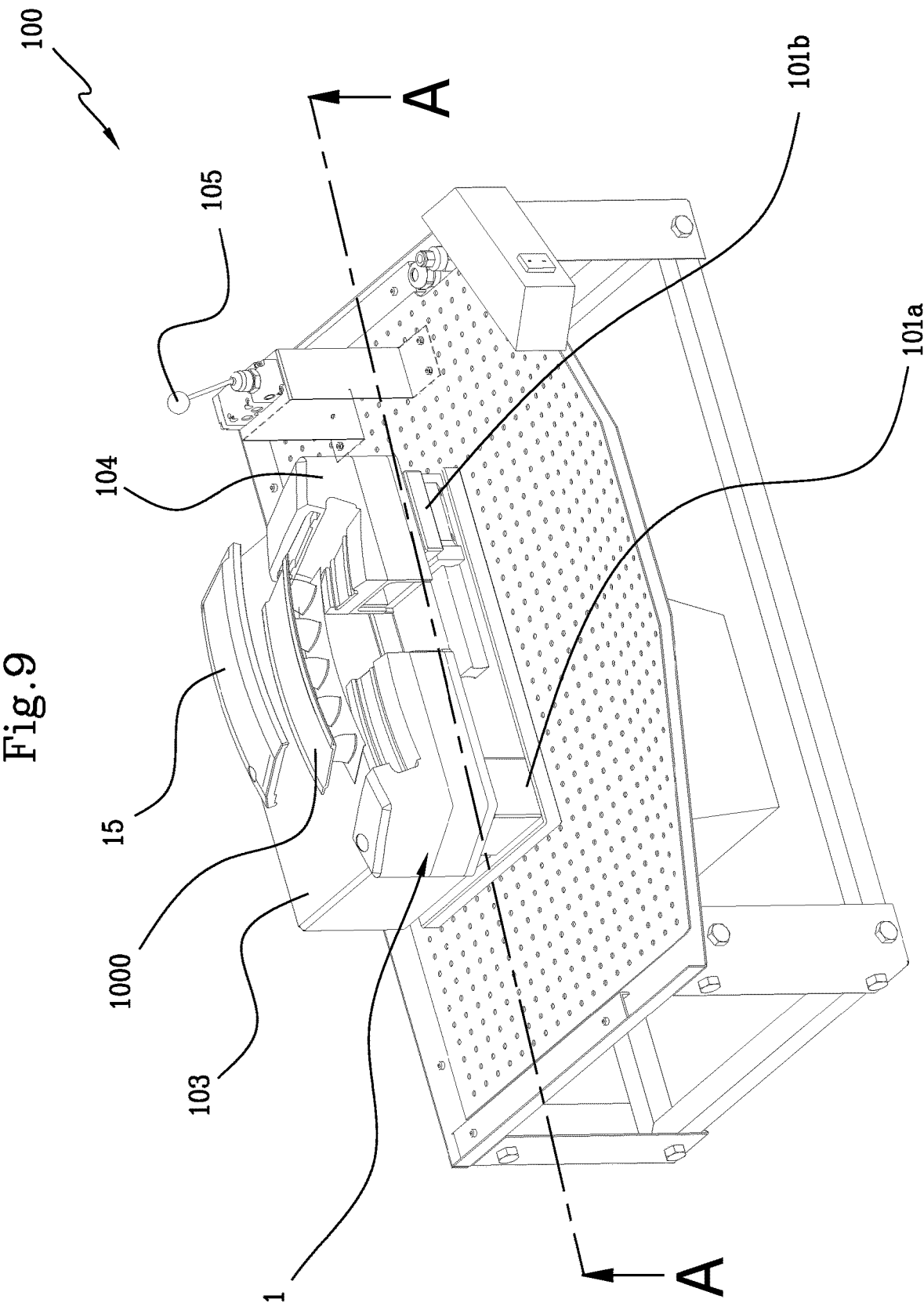
FIG. 9 illustrates, in a perspective view, a movement system for configuring the device illustrated in FIG. 1 at least in an opening position.
Figure 10:
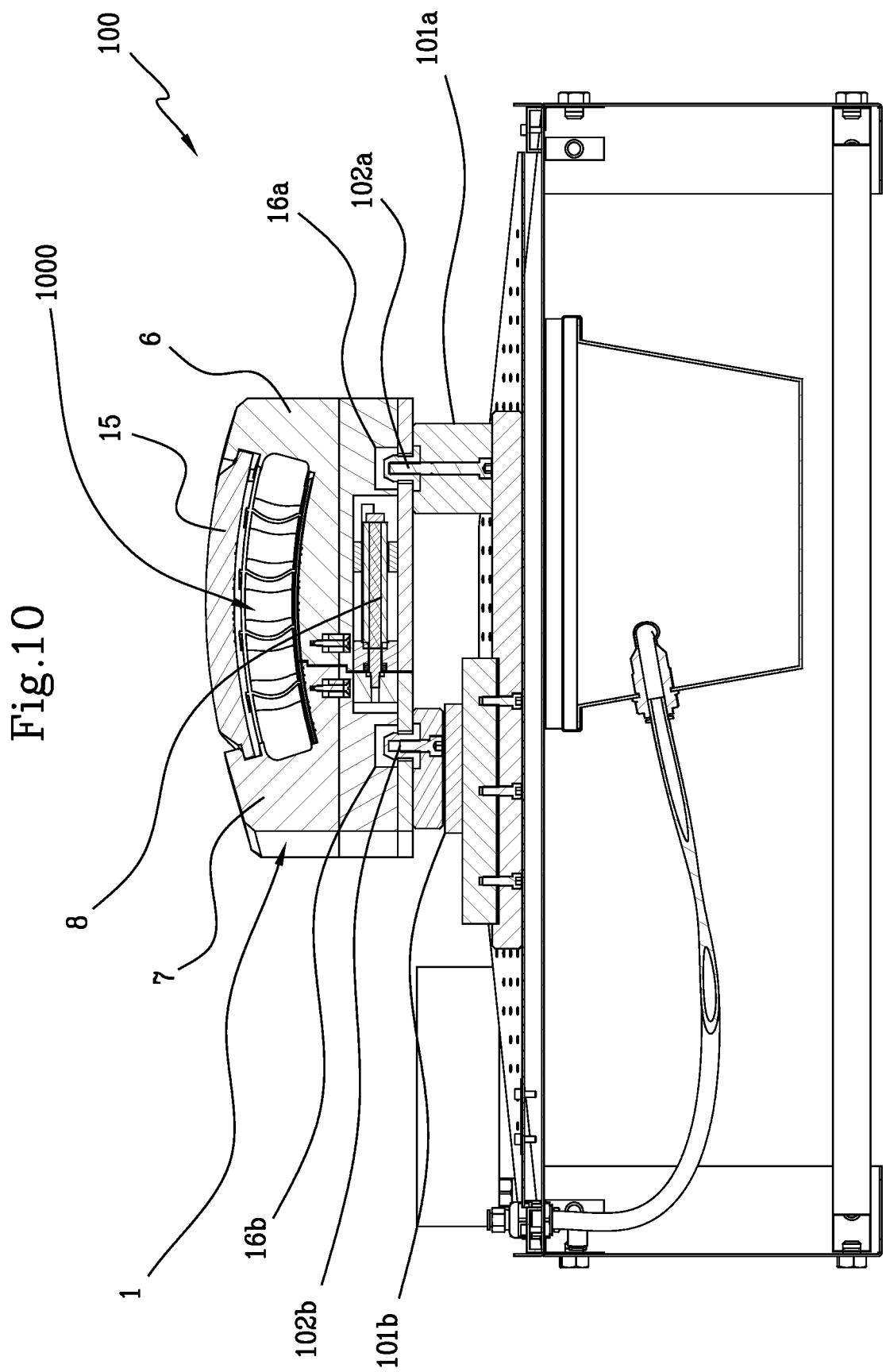
FIG. 10 illustrates, in a lateral view, a section along the plane A-A of the movement system illustrated in FIG. 8.

In particular, FIGS. 8 and 9 illustrate a preferred embodiment of the movement system 100.

Preferably, the movement system 100 comprises a static fulcrum 101*a*, on which a first plunger 102*a* is arranged, which first plunger 102*a* can be coupled with a first seat 16*a* of the device 1, and a dynamic fulcrum 101*b*, on which a second plunger 102*b* is arranged, which second plunger 102*b* can be coupled with a second seat 16*b* of the device 1. In addition, the movement system 100 comprises an actuator 103, for example a mechanical piston, configured to move the dynamic fulcrum 101*b* towards (as seen in FIG. 8) and away from (as seen in FIG. 9) the static fulcrum 101*a*.

Thereby, when the fulcrums 101*a*, 101*b* of the movement system 100 are arranged at a minimum distance from each other, the plungers 102*a*, 102*b* can correctly be coupled with the respective seats 16*a*, 16*b* of the device 1 for holding, which is configured in the first operating position (i.e. with the retaining elements 6, 7 in an approached position).

The subsequent activation of the actuator 103 involves moving the dynamic fulcrum 101*b* away from the static fulcrum 101*a* and, consequently, distancing the retaining elements 6, 7 of the device 1 which is configured in the second operating position. In this position, any covering element 15, if present, and the product 1000 to be processed/the processed product 1000 are easily insertable and/or removable from the device 1 for holding.

In other words, the actuator 103 of the movement system 100 is advantageously capable of counteracting the force impressed by the actuation member 8 of the device 1 useful for keeping the latter in the first operating position.

In accordance with a preferred aspect of the invention, the actuator 103 is connected to a selector element 105, for example a mechanical lever, configured to arrange the same actuator 103 in at least three different operating configurations:
  a first opening configuration (FIG. 9), in which the static fulcrum 101*a* and the dynamic fulcrum 101*b* are kept distanced from each other by the actuator 103 so as to arrange the device 1 in the second operating position;
  a second idle configuration (FIG. 8), in which the actuator 103 does not apply any force between the static fulcrum 101*a* and the dynamic fulcrum 101*b* and, therefore, the actuation member 8 of the same device 1 is capable of returning the same device 1 to the first operating position by approaching the static fulcrum 101*a* and the dynamic fulcrum 101*b* each other;
  a third closing configuration (FIG. 8), in which the actuator 103 generates a thrust force between the static fulcrum 11*a* and the dynamic fulcrum 101*b* so as to ensure that the first portion 3 and the second portion 4 of the device 1 are abutted against each other.

The third closing configuration is advantageously useful when, for example after several work cycles of the device 1, the actuation member 8 has a reduced efficiency in bringing the device 1 from the second operating position into the first operating position. Thereby, therefore, the actuator 103 is capable of ensuring that the device 1 is actually in the first operating position before being arranged in the apparatus 50 for polishing and tumbling and, therefore, that the product 1000 to be processed is effectively held in a stable position over time for the processing thereof.

The aforementioned description of the three configurations of the actuator 103 considers that the actuation member 8 is configured to mutually approach the first and the second portion 3, 4 of the device 1 each other to bring them into the first operating position.

If the actuation member 8 is configured to work in the opposite manner, then the actuator 103 of the movement system 100 is also configured to work in the opposite manner to what has already been described.

Preferably, the movement system 100 comprises a regulating element 104 associated with the actuator 103 and configured to vary the maximum distance at which the dynamic fulcrum 101b can be moved with respect to the static fulcrum 101a.

For example, the regulating element 104 comprises an endless screw coupled with a ring nut (not visible) and configured to move an end-stroke element adapted to define a mechanical limit to the movement of the dynamic fulcrum 101b along the operating direction T.

Alternatively, the regulating element 104 is a mechanical or pneumatic valve configured to regulate the movement of the mechanical or pneumatic piston defining the actuator 103.

In other words, to install a product 1000 to be processed inside the device 1 (or to remove it after processing), an operator must apply the following steps:
- coupling the device 1 with a movement system 100 so that a plunger is inserted inside the respective seat 16a, 16b;
- activating the movement system 100 so that the piston moves the first portion 3 and the second portion 4 into the second operating position;
- providing (or removing) the product 1000 to be processed in the device 1 in the second operating position;
- deactivating the movement system 100 so that the piston again moves the first portion 3 and the second portion 4 into the first operating position to constrain in position the product 1000 to be processed.

The invention claimed is:

1. A device for holding in position a product to be processed, comprising:
a base having a magnetic or ferromagnetic or electromagnetic element adapted to interact by means of magnetic interaction with a work surface of an apparatus for tumbling or polishing; said base comprising a first portion and a second portion movable along an operating direction mutually towards or away from a first and a second operating position;
a retaining support connected to said base and configured to hold in a stable position a product to be processed; said retaining support having a first retaining element connected to said first portion and a second retaining element connected to said second portion;
an actuation member configured to move said first portion and said second portion with the related retaining elements between said first operating position, wherein said retaining support is configured to impart a force onto the product to be processed so as to hold it in a stable and integral position with the device itself, and said second operating position, wherein said first and second retaining element are distanced from the product to be processed so as to allow the removal from or installation thereof in said device,
wherein said actuation member comprises an elastic element normally configured to move said first portion and said second portion of said base into the first operating position.

2. The device according to claim 1, wherein each retaining element comprises a lower portion and an upper portion; said lower portion being interposed between said upper portion and said base; said upper portion comprising an active surface conformed to adapt to a portion of a product to be processed so as to retain it when said first portion and said second portion are arranged in the first operating position.

3. The device according to claim 2, wherein said lower portion and said upper portion of each retaining element define a single body.

4. The device according to claim 2, wherein each lower portion and each upper portion of said retaining elements define physically separate entities that can be connected to one another.

5. The device according to claim 2, wherein said retaining support comprises at least one junction element interposed at least between a lower portion and the respective upper portion for constraining them to one another.

6. The device according to claim 1, comprising a housing defined between said base and said retaining support configured for the containment of at least said actuation member.

7. The device according to claim 6, wherein said at least one alignment element is arranged in said housing.

8. The device according to claim 1, wherein said elastic element is a spring, preferably helical, or a gas spring.

9. The device according to claim 1, wherein said base comprises at least one alignment element extending along the operating direction interposed between said first portion and said second portion configured to keep aligned said first portion and said second portion during their mutual movement between the first and the second operating position.

10. The device according to claim 1, wherein said base comprises a plate made of a magnetic or ferromagnetic material adapted to interact with a magnetic field generated by a work surface of the apparatus.

11. The device according to claim 10, wherein said plate is arranged below said base with respect to said retaining support.

12. The device according to claim 1, wherein said retaining support comprises a gasket element interposed between said retaining elements.

13. The device according to claim 1, comprising a covering element that can be interposed between said first retaining element and said second retaining element; said covering element being configured to impart on the product to be processed a pressing force towards the work surface of the apparatus along an orthogonal direction to the operating direction and to the work surface, said covering element having a contact surface with the product to be processed and configured, in use, to impart said pressing force.

14. An apparatus for tumbling or polishing, comprising:
a box shaped body having a work surface and configured to contain an abrasive material and at least one product to be processed;

a motor connected to said box shaped body and configured to generate a sussultatory or vibrational movement on said box shaped body; said motor being solidly constrained to at least said work surface;

a magnetic means connected at least to said work surface configured to generate a field of magnetic attraction or to interact with a field of magnetic attraction having field lines that intersect the same work surface;

a device according claim 1, inserted in said box shaped body on said work surface; said device being able to be configured between a magnetic interaction condition, in which it is maintained in a solidly constrained position with said work surface during processing, and a free condition, in which it is unconstrained and movable with respect to said work surface.

15. A tumbling or polishing system, comprising:

a device according to claim 1;

a movement system comprising:
- a static fulcrum on which a first plunger is arranged, which first plunger can be coupled with a first seat of said device;
- a dynamic fulcrum on which a second plunger is arranged, which second plunger can be coupled with a second seat of said device;
- an actuator configured to move the dynamic fulcrum towards and/or away from the static fulcrum so as to move said first portion and said second portion of said device between said first operating position and said second operating position.

16. A method for holding in position a product to be processed through tumbling or polishing, comprising the steps of:

providing an apparatus for tumbling or polishing according to claim 14;

providing a device according to claim 1;

moving said first portion and said second portion of said base with the related retaining elements into the second operating position so as to insert a product to be processed between said first retaining element and said second retaining element;

moving said first portion and said second portion into the first operating position so that the retaining elements of said retaining support hold in position the product to be processed;

inserting said device into said box shaped body of said apparatus for tumbling or polishing;

generating a field of magnetic attraction for constraining said device to said work surface of the apparatus so that said device and said work surface are solidly constrained and relatively stationary with respect to one another during processing.

* * * * *